(12) United States Patent
Todorov et al.

(10) Patent No.: US 12,374,037 B2
(45) Date of Patent: Jul. 29, 2025

(54) METHOD AND SYSTEM FOR GENERATING A THREE-DIMENSIONAL GLOBAL POSE FROM AN IMAGE

(71) Applicant: Red Pill Lab Limited, Hong Kong (HK)

(72) Inventors: Dobromir Todorov, Hong Kong (HK); Ting-Chieh Lin, New Taipei (TW); Tsung-Yuan Hsu, Taipei (TW); Chien-Hung Shih, Taipei (TW)

(73) Assignee: RED PILL LAB LIMITED, Hong Kong (HK)

( * ) Notice: Subject to any disclaimer, the term of this patent is extended or adjusted under 35 U.S.C. 154(b) by 245 days.

(21) Appl. No.: 18/180,029

(22) Filed: Mar. 7, 2023

(65) Prior Publication Data

US 2024/0303917 A1 Sep. 12, 2024

(51) Int. Cl.
G06T 17/00 (2006.01)
G06T 7/73 (2017.01)
G06T 13/40 (2011.01)

(52) U.S. Cl.
CPC .............. *G06T 17/00* (2013.01); *G06T 13/40* (2013.01); *G06T 2207/20044* (2013.01); *G06T 2207/20084* (2013.01); *G06T 2207/30196* (2013.01)

(58) Field of Classification Search
CPC ........... G06T 17/00; G06T 7/73; G06T 13/40; G06T 2207/20044; G06T 2207/20084; G06T 2207/30196; G06T 7/75
See application file for complete search history.

(56) References Cited

U.S. PATENT DOCUMENTS

| | | | |
|---|---|---|---|
| 2023/0306698 A1* | 9/2023 | Kulkarni | G06V 40/10 |
| 2023/0401740 A1* | 12/2023 | Zhang | G06T 7/73 |
| 2024/0320850 A1* | 9/2024 | Yamazaki | G06T 7/73 |

OTHER PUBLICATIONS

A. Makris and A. Argyros, "Robust 3D Human Pose Estimation Guided by Filtered Subsets of Body Keypoints," 2019 16th International Conference on Machine Vision Applications (MVA), Tokyo, Japan, 2019, pp. 1-6 (Year: 2019).*

* cited by examiner

*Primary Examiner* — Said Broome
*Assistant Examiner* — Andrew Shin
(74) *Attorney, Agent, or Firm* — HSML P.C.

(57) ABSTRACT

A method for generating a three-dimensional (3D) global pose includes: receiving an image and performing a detection operation to detect a human body in the image; obtaining a two-dimensional (2D) heatmap that is related to a skeleton structure of the human body and that includes a plurality of human keypoints, and obtaining a plurality of 2D coordinate sets each indicating a position of a corresponding one of the human keypoints; performing a 3D human pose estimation operation on the plurality of 2D coordinate sets to obtain a 3D human pose that is related to the skeleton structure in a local coordinate system, and that includes a plurality of 3D keypoints corresponding to the plurality of human keypoints, respectively; and based on the 3D human pose, using a numerical optimization solver to generate a 3D global pose in a world coordinate system.

10 Claims, 7 Drawing Sheets

METHOD AND SYSTEM FOR GENERATING A THREE-DIMENSIONAL GLOBAL POSE FROM AN IMAGE

FIELD

The disclosure relates to a method and a system for generating a three-dimensional global pose from an image using artificial intelligence.

BACKGROUND

In the field of computer animation involving motion capture, one application involves performing image processing on images from a camera feed to detect a human body, determining a human pose based on the human body, and projecting the human pose onto a world coordinate system.

In practice, typical factors of concern include the cost of hardware equipment implementations, the amount of calculations involved, the time to process the calculations, the accuracy of a human pose in the world coordinate system, etc. Conventionally, for a commercially available system for computer animation, in order to obtain a relatively satisfactory result, requirements for hardware equipment are typically high, and the amount of calculations is also large.

SUMMARY

One object of the disclosure is to provide a method that is configured to generating a three-dimensional global pose from an image, with increased efficiency.

According to one embodiment of the disclosure, the method for generating a three-dimensional (3D) global pose from an image is implemented using a system that includes a computing device and a camera which is configured to capture the image. The method includes:
  a) by the computing device, receiving the image from the camera, and performing a detection operation to detect a human body in the image;
  b) by the computing device, using a first neural network, based on the image in which the human body has been detected, to obtain a two-dimensional (2D) heatmap that is related to a skeleton structure of the human body and that includes a plurality of human keypoints corresponding to a plurality of joints of the human body, and performing a regression operation on the 2D heatmap to obtain a plurality of 2D coordinate sets each associated with one of the joints, and indicating a position of a corresponding one of the human keypoints in a 2D coordinate system of the 2D heatmap;
  c) by the computing device, using a second neural network to perform a 3D human pose estimation operation on the plurality of 2D coordinate sets, so as to obtain a 3D human pose that is related to the skeleton structure of the human body in a local coordinate system, and that includes a plurality of 3D keypoints corresponding to the plurality of human keypoints, respectively; and
  d) by the computing device based on the 3D human pose, using a numerical optimization solver to generate a 3D global pose in a world coordinate system, the numerical optimization solver being Ceres solver,
  wherein step d) includes
    d-1) generating an initial guess shape for the 3D global pose by using Levenberg-Marquardt (LM) algorithm and a dense QR factorization to obtain plural sets of coordinates in the world coordinate system for the plurality of 3D keypoints, respectively, the initial guess shape including the plural sets of coordinates,
    d-2) performing an iterative fitting procedure on the initial guess shape with reference to the plurality of 2D coordinate sets using the numerical optimization solver, so as to generate an updated shape that includes a plurality of 3D coordinate sets which respectively correspond to the joints of the human body,
    d-3) calculating an error associated with the updated shape, the calculation being implemented based on a difference between projections of the plurality of 3D coordinate sets of the updated shape onto the 2D coordinate system and the plurality of 2D coordinate sets, a relationship between each of feet of the updated shape and a floor in the world coordinate system, and an acceleration associated with each of the joints of the updated shape relative to a previous global 3D pose generated with respect to a previous image,
    d-4) determining whether the error indicates that the updated shape is an optimized shape,
    d-5) when it is determined that the error indicates that the updated shape is the optimized shape, using the updated shape as the 3D global pose, and
  when it is determined that the error indicates that the updated shape is not the optimized shape, using the updated shape as the initial guess shape, and repeating sub-steps d-2) to d-5).

Another object of the disclosure is to provide a system that is configured to implement the above-mentioned method.

According to one embodiment of the disclosure, the system for generating a three-dimensional (3D) global pose from an image includes:
  a computing device that includes a processor and a data storage medium which stores a first neural network, a second neural network and a numerical optimization solver; and
  a camera that is coupled to the computer device and that is configured to capture an image.

The system is configured to perform steps of the above-mentioned method, so as to generate a 3D global pose in a world coordinate system.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
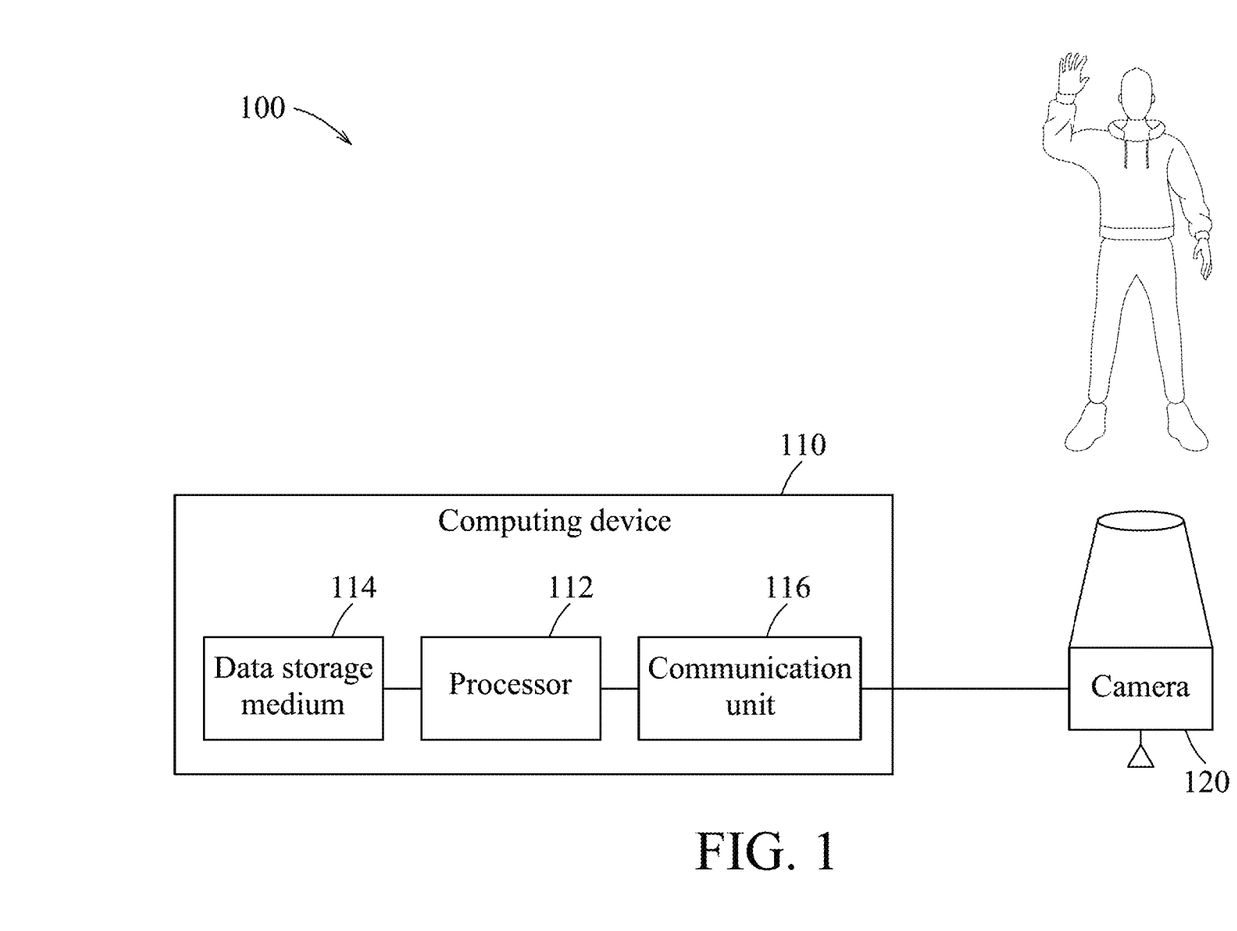
FIG. 1 is a schematic diagram of a system for generating a three-dimensional (3D) global pose from an image according to one embodiment of the disclosure.

FIG. 1 is a schematic diagram of a system 100 for generating a three-dimensional (3D) global pose from an image according to one embodiment of the disclosure.

The system 100 includes a computing device 110 and a camera 120 coupled to the computing device 110.

The computing device 110 may be embodied using a personal computer, a laptop, a tablet, a smartphone, etc., and includes a processor 112, a data storage medium 114, and a communication unit 116.

The processor 112 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage medium 114 may be embodied using, for example, random access memory (RAM), read only memory (ROM), programmable ROM (PROM), firmware, and/or flash memory, etc.

The communication unit 116 may include one or more of a radio-frequency integrated circuit (RFIC), a short-range wireless communication module supporting a short-range wireless communication network using a wireless technology of Bluetooth® and/or Wi-Fi, etc., and mobile communication module supporting telecommunication using Long-Term Evolution (LTE), the third generation (3G), the fourth generation (4G) or fifth generation (5G) of wireless mobile telecommunications technology, or the like.

The camera 120 may be embodied using a digital camera or a video recorder such as a webcam, a depth camera, etc., and is configured to continuously capture images. It is noted that while in this embodiment, the camera 120 is a component separate from and connected to the computing device 110, in other embodiments, the camera 120 may also be a component built in the computing device 110 (e.g., a back-facing camera of a smartphone).

The data storage medium 114 may store a software application and a number of neural networks. The software application includes instructions that, when executed by the processor 112, cause the processor 112 to perform the operations as described below. Each of the neural networks is pre-trained using one or more specific datasets, is stored in the data storage medium 114, and when executed by the processor 112 and applied with data serving as an input, generates new data as an output.

Figure 2:
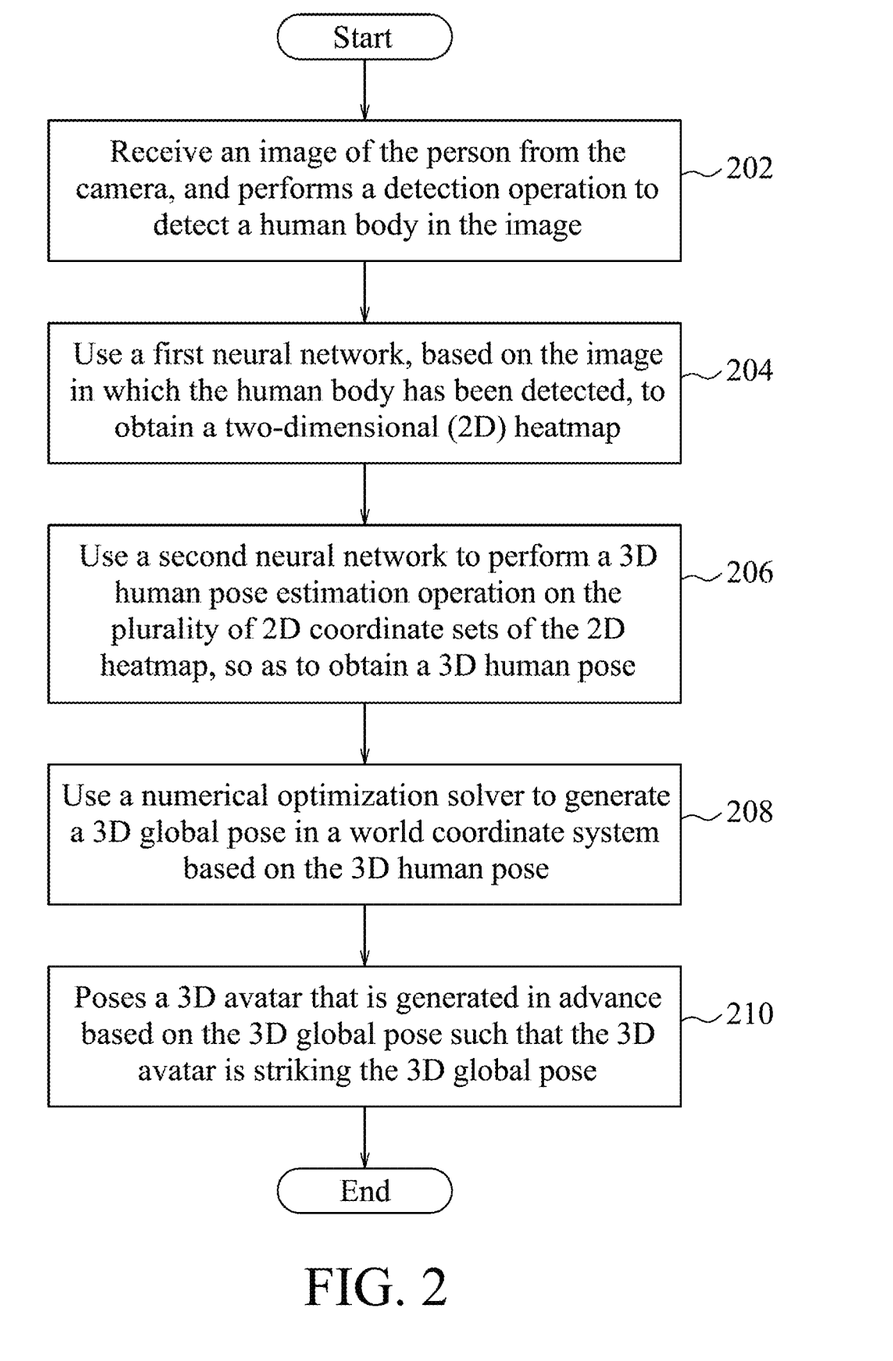
FIG. 2 is a flow chart illustrating steps of a method for generating a 3D global pose from an image according to one embodiment of the disclosure.

FIG. 2 is a flow chart illustrating steps of a method for generating a three-dimensional global pose from an image according to one embodiment of the disclosure. In this embodiment, the method is implemented using the system 100 as illustrated in FIG. 1. In use, when it is intended to generate a three-dimensional global pose based on a human body included in an image, the system 100 is configured to perform the operations as described below.

Figure 3:
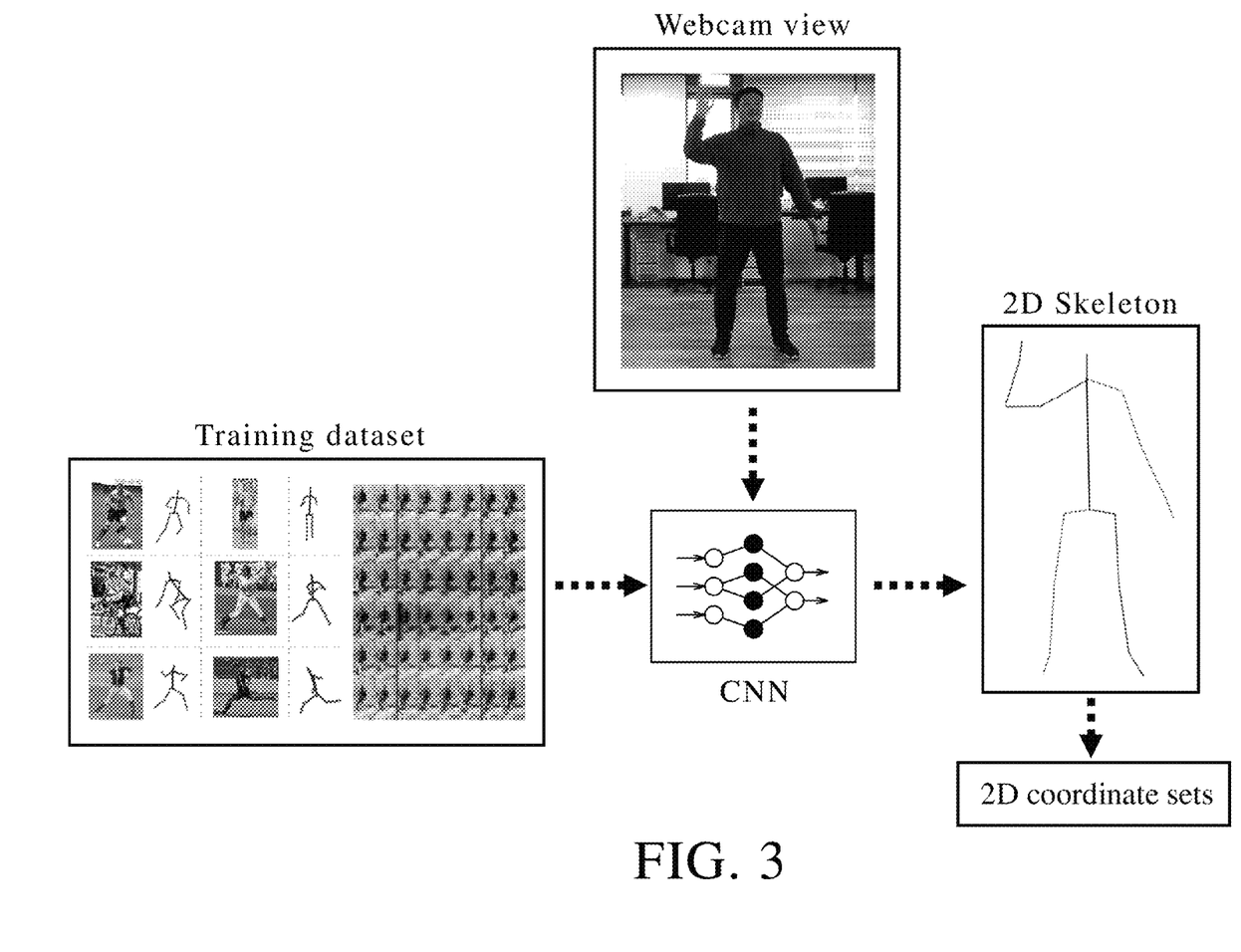
FIG. 3 illustrates the operations relating to a step of the method that uses a first neural network to obtain a two-dimensional (2D) heatmap from an image.

Firstly, the camera 120 is oriented to point at a person and activated so as to start continuously capturing images of the person. Specifically, in this embodiment, the camera 120 is so placed that the entire body of the person can be captured by the camera 120. The person may strike a pose (e.g., raising one hand, as shown in FIG. 3) or move around within the range of the camera 120. Then, an operator may operate the computer device 110 to execute the software application, thus commencing the method. It is noted that the images captured by the camera 120 may also include a background environment that may include a floor and a number of objects. Using the image, the relative locations among the person and various objects in the background environment may be obtained. It is noted that the operations recited in the steps of the method in this embodiment are performed with respect to each of the images captured by the camera 120.

In step 202, the processor 112 receives the image of the person from the camera, and performs a detection operation to detect a human body in the image. The detection operation may be performed by the processor 112 executing a human detection function that is available in the Open Source Computer Vision Library (OpenCV).

Afterward, in step 204, the processor 112 uses a first neural network, based on the image in which the human body has been detected, to obtain a two-dimensional (2D) heatmap that is related to a skeleton structure of the human body and that includes a plurality of human keypoints corresponding to specific parts of the human body. Specifically, the human keypoints correspond to a plurality of joints of the human body, and some of the human keypoints may correspond to other additional specific parts of the human body (e.g., a head) in other embodiments. Then, the processor 112 performs a regression operation on the 2D heatmap to obtain a plurality of 2D coordinate sets. Each of the plurality of 2D coordinate sets is associated with one of the joints and indicates a position of a corresponding one of the human keypoints in a 2D coordinate system of the 2D heatmap.

FIG. 3 illustrates the operations relating to step 204 to be performed using the first neural network. In this embodiment, the first neural network is a convolutional neural network (CNN) that uses modified SelecSLS as a backbone and modified Lightweight human pose estimation as a main framework, and is trained using a number of training datasets. Specifically, in this embodiment, the training datasets include a Microsoft Common Objects in Context (MS COCO) dataset, a Haple Full-Body Human Keypoints and HOI-Det dataset, and a PoseTrack dataset. Additional materials such as individual images and continuous video frames may also be employed as training datasets to result in an improved result associated with the outputted 2D heatmap, including an improved temporal consistency. In some embodiments, the first neural network may have a recurrent training structure. In some embodiments, the first neural network may also include various processing functions that are known in the related art, such as filtering, hidden joints handling, processing optimization, etc.

As shown in FIG. 3, in step 204, the image obtained from the camera 120 is applied to the first neural network as an input, and the output of the first neural network is the 2D heatmap that includes the human keypoints. Then, the regression operation is performed on the 2D heatmap to obtain the plurality of 2D coordinate sets. In the embodiment, the regression operation may be implemented using a commercially available for the sake of brevity.

In step 206, the processor 112 uses a second neural network to perform a 3D human pose estimation operation on the plurality of 2D coordinate sets of the 2D heatmap, so as to obtain a 3D human pose. The 3D human pose is related to the skeleton structure of the human body in a local coordinate system, and includes a plurality of 3D keypoints corresponding to the plurality of human keypoints, respectively.

Figure 4:
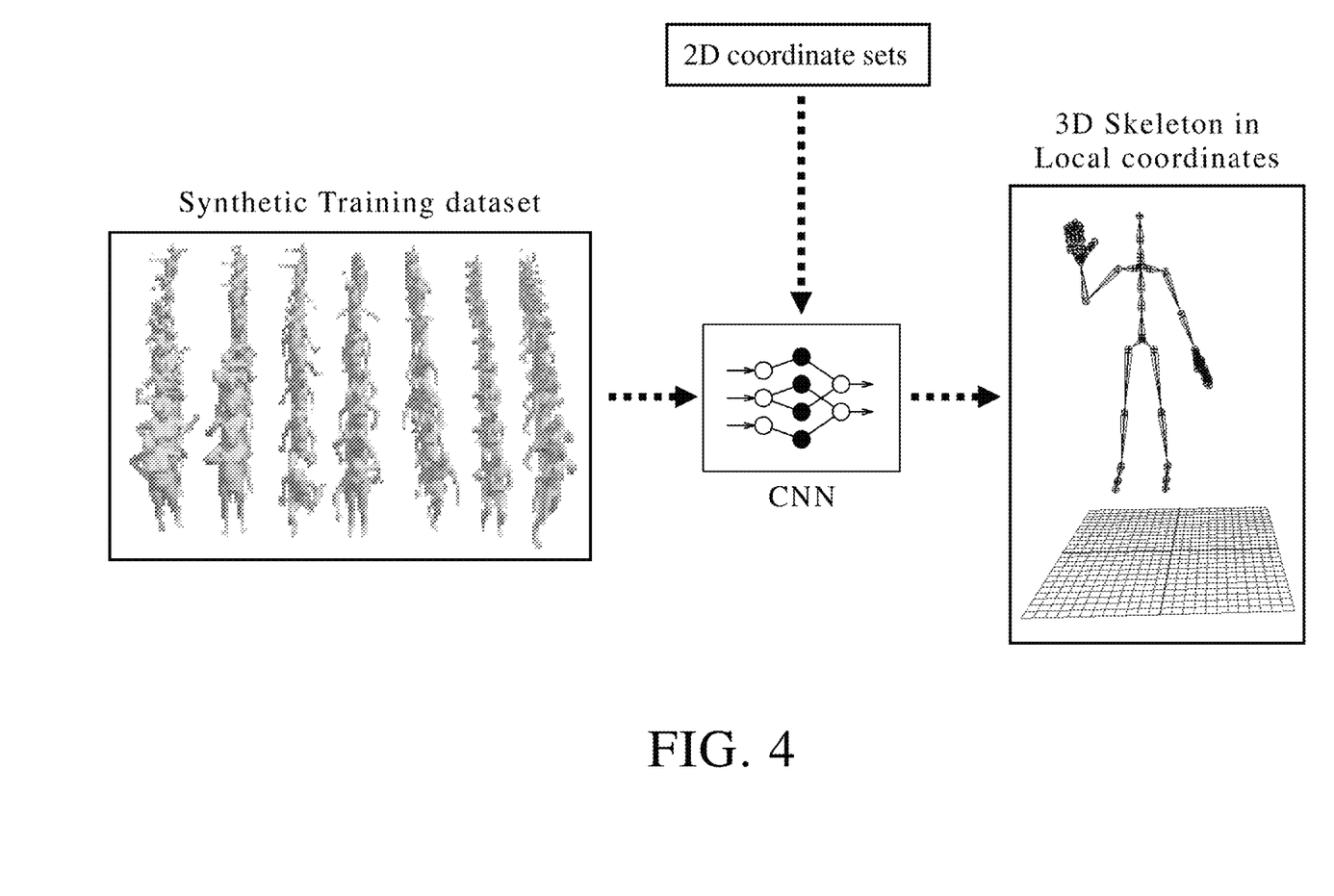
FIG. 4 illustrates the operations relating to a step of the method that uses a second neural network to obtain a 3D human pose from the 2D heatmap.

FIG. 4 illustrates the operations relating to step 206 to be using the second neural network. In this embodiment, the second neural network is a CNN and trained using a synthesis dataset generated using the Archive of Motion Capture as Surface Shapes (AMASS) dataset.

As shown in FIG. 4, in step 206, the plurality of 2D coordinate sets of the 2D heatmap are applied into the second neural network as an input, and the output of the second neural network is the 3D human pose in the local coordinate system.

Then, in step 208, the processor 112 uses a numerical optimization solver to generate a 3D global pose in a world coordinate system (as opposed to the local coordinate system) based on the 3D human pose. It is noted that the operations of step 208 may also be referred to as a world coordinate alignment process.

Figure 5:
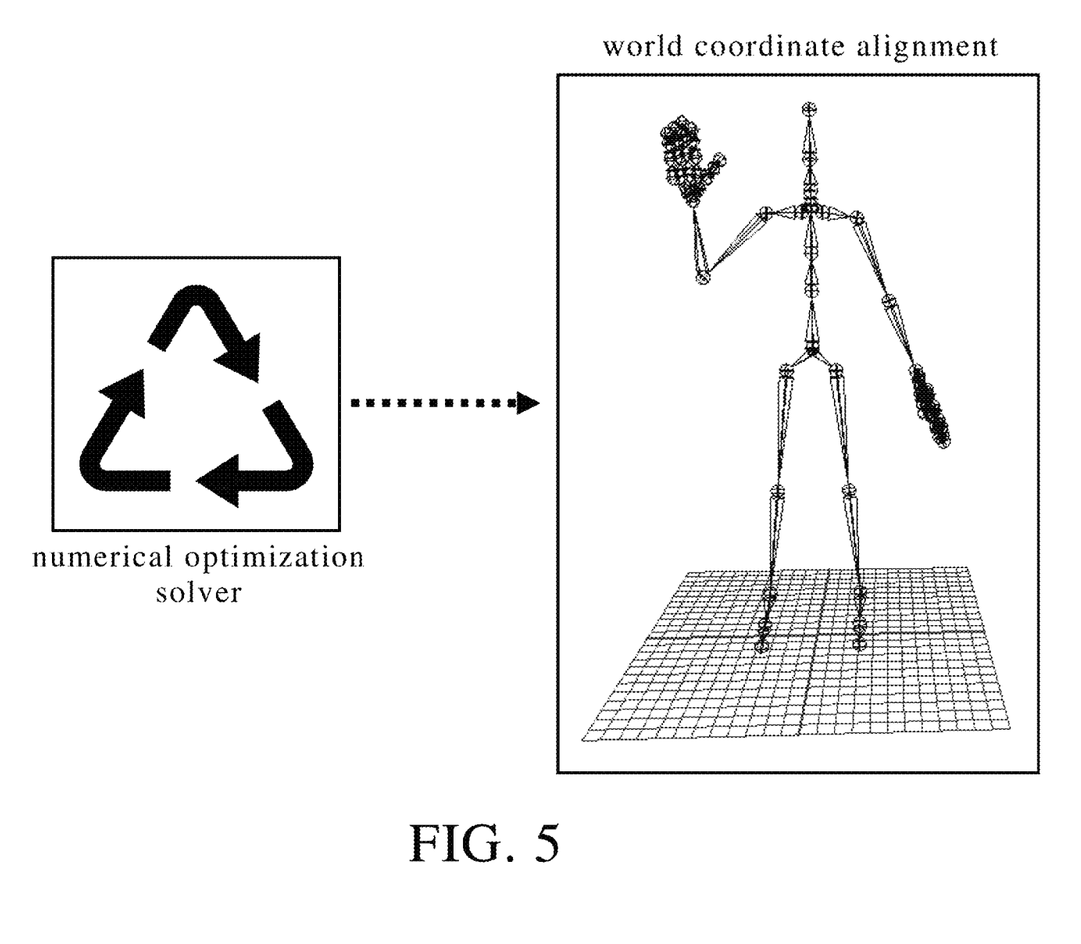
FIG. 5 illustrates the operations relating to a step of the method that uses a numerical optimization solver to generate a 3D global pose from the 3D human pose, a process known as a world coordinate alignment process.

FIG. 5 illustrates the operations relating to step 208 to be performed using the numerical optimization solver. In this embodiment, the numerical optimization solver is Ceres solver, but the implementation of the numerical optimization solver is not limited to such.

Figure 6:
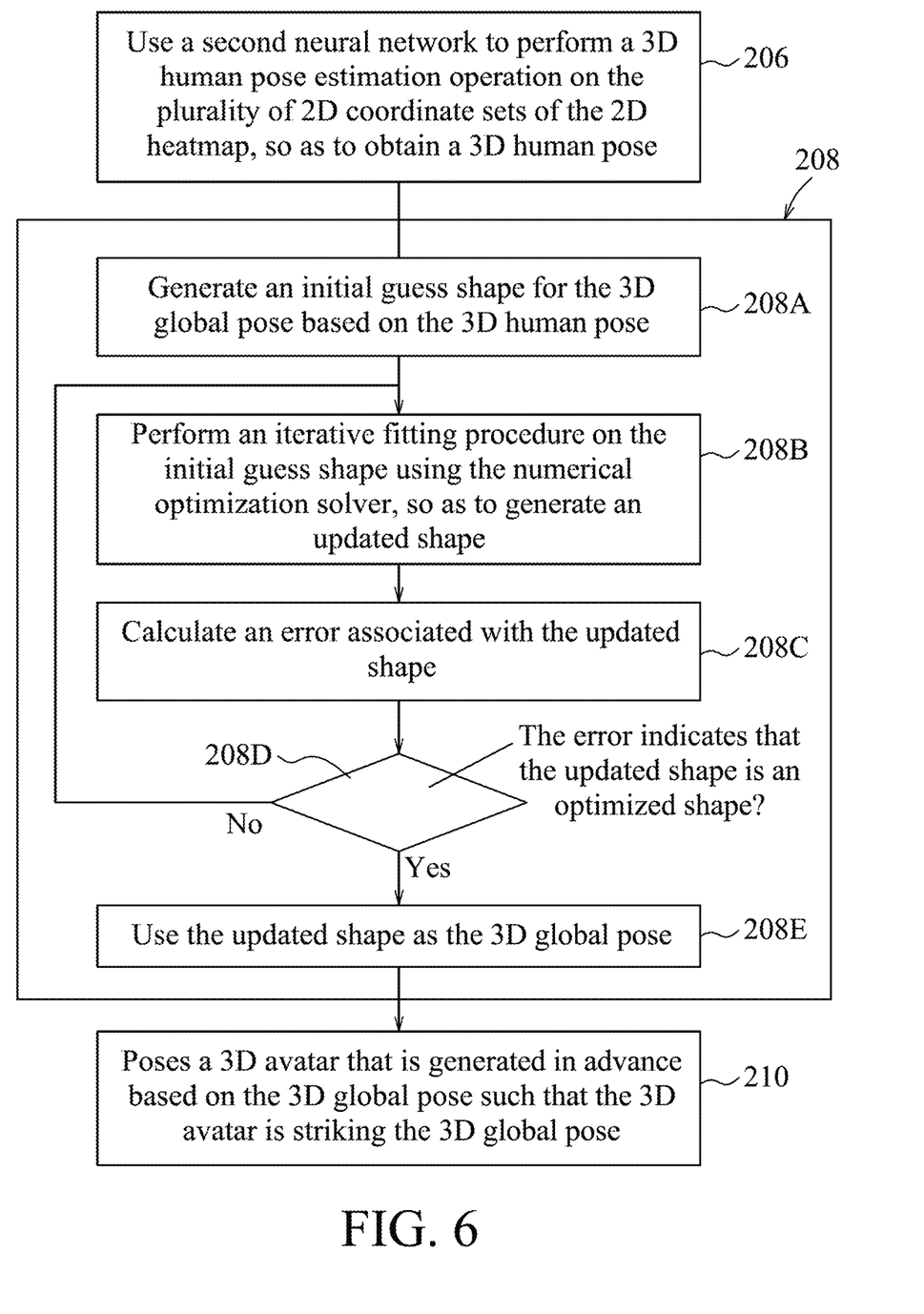
FIG. 6 is a flow chart illustrating sub-steps of the world coordinate alignment process according to one embodiment of the disclosure

Specifically, FIG. 6 is a flow chart illustrating the sub-steps of the world coordinate alignment process according to one embodiment of the disclosure.

In sub-step 208A, the processor 112 generates an initial guess shape for the 3D global pose based on the 3D human pose. Specifically, sub-step 208A includes using a Levenberg-Marquardt (LM) algorithm and a dense QR factorization to obtain plural sets of coordinates in the world coordinate system for the plurality of 3D keypoints, respectively. The initial guess shape includes the plural sets of coordinates, and is used as a basis for attempting to "guess" an optimized shape to serve as the 3D global pose.

Then, in sub-step 208B, the processor 112 performs an iterative fitting procedure on the initial guess shape with reference to the plurality of 2D coordinate sets of the 2D heatmap using the numerical optimization solver, so as to generate an updated shape. The updated shape includes a plurality of 3D coordinate sets that respectively correspond to the joints of the human body.

In sub-step 208C, the processor 112 calculates an error associated with the updated shape. In this embodiment, the error may be in the form of a single value. The calculation is implemented based on a difference between projections of the plurality of 3D coordinate sets of the updated shape onto the 2D coordinate system and the plurality of 2D coordinate sets, a relationship between each of feet of the updated shape and a floor in the world coordinate system (shown in the background environment captured in the image), and an acceleration associated with each of the joints of the updated shape relative to a previous global 3D pose generated with respect to a previous image. In some embodiments, the error may be in the form of one or multiple sets of values, with each set having values that are related to the difference between the projections of the plurality of 3D coordinate sets of the updated shape onto the 2D coordinate system and the plurality of 2D coordinate sets, the relationship between each of the feet of the updated shape and the floor in the world coordinate system, and the accelerations, respectively. It is noted that in embodiments, each of the one or multiple sets of values forming the error corresponds to a body part and is assigned a weight, and the error may be represented as one or multiple weighted sets of values. In some cases, for each of the one or multiple sets of values, the weight assigned thereto may be dynamically changed for different situations.

It is noted that such a calculation is done to ensure that the resulting 3D global pose is generated to be more realistic in the real world; in most cases, a distance between a same joint in two successive 3D global poses should not be too large as to suggest a sudden move that is physically impossible. As such, in any of the cases where (1) the difference between the projections of the plurality of 3D coordinate sets of the updated shape onto the 2D coordinate system and the plurality of 2D coordinate sets is determined to be larger than a predetermined range; or (2) the acceleration associated with one or more of the joints of the updated shape is too large, the resulting error calculated would also be higher. Additionally, based on the projections of the plurality of 3D coordinate sets of the updated shape obtained from both the image and the previous image onto the 2D coordinate system, the processor 112 is able to determine whether each of the feet of the updated shape has moved with respect to the floor. In the case where the person is standing still, it would be determined that the projections are identical and the relationship between each of the feet of the updated shape and the floor is unchanged, so the weight to be assigned to one of the sets of values for forming the error that corresponds to the feet would be larger. That is, the feet of the resulting 3D global pose are more likely to stay unmoved. On the other hand, in the case where the person is not standing still (i.e., one or both of the feet are moving), it would be determined that the projections are not identical and the relationship between the feet and the floor is changed, so the weight to be assigned to the one of the sets of values for forming the error that corresponds to the feet would be lower. That is to say, the generation of the resulting 3D global pose may rely more heavily on other sets of values, since the one (or both) of the feet is (are) moving.

In sub-step 208D, the processor 112 determines whether the error indicates that the updated shape is an optimized shape. Specifically, in some cases, when the error is lower than a predetermined threshold, the processor 112 may determine that the error indicates that the updated shape is an optimized shape. Alternatively, in some cases, when the error has converged to a specific value that is higher than the predetermined threshold after a number of iterations, the processor 112 may determine that the error indicates that the updated guess shape is an optimized shape (i.e., the best guess shape is achieved since a better guess shape is not achievable).

In the case where the error indicates that the updated guess shape is the optimized shape, the flow proceeds to sub-step 208E, in which the processor 112 uses the updated shape as the 3D global pose. Otherwise, the updated shape is used as the initial guess shape and the flow goes back to sub-step 208B to generate another updated shape based on the updated shape (i.e., to perform an iteration on the updated shape), and to repeat sub-steps 208C and 208D to determine whether another iteration is needed.

After generating the 3D global pose, the processor 112 is now able to utilize the 3D global pose in different manners based on the intended application. For example, in some embodiments, the method may further include a step 210, in which the processor 112 poses a 3D avatar, parts of which may be generated in advance, based on the 3D global pose such that the 3D avatar is striking the 3D global pose. The 3D avatar striking the 3D global pose may then be presented on an interface 700 (see FIG. 7) such as a display screen of a computer device or a headset, etc. In embodiments, the content displayed by the interface 700 may include the 3D avatar and the background environment captured in the image. In some cases, the content displayed by the interface 700 may include the 3D avatar being immersed in a virtual environment.

Figure 7:
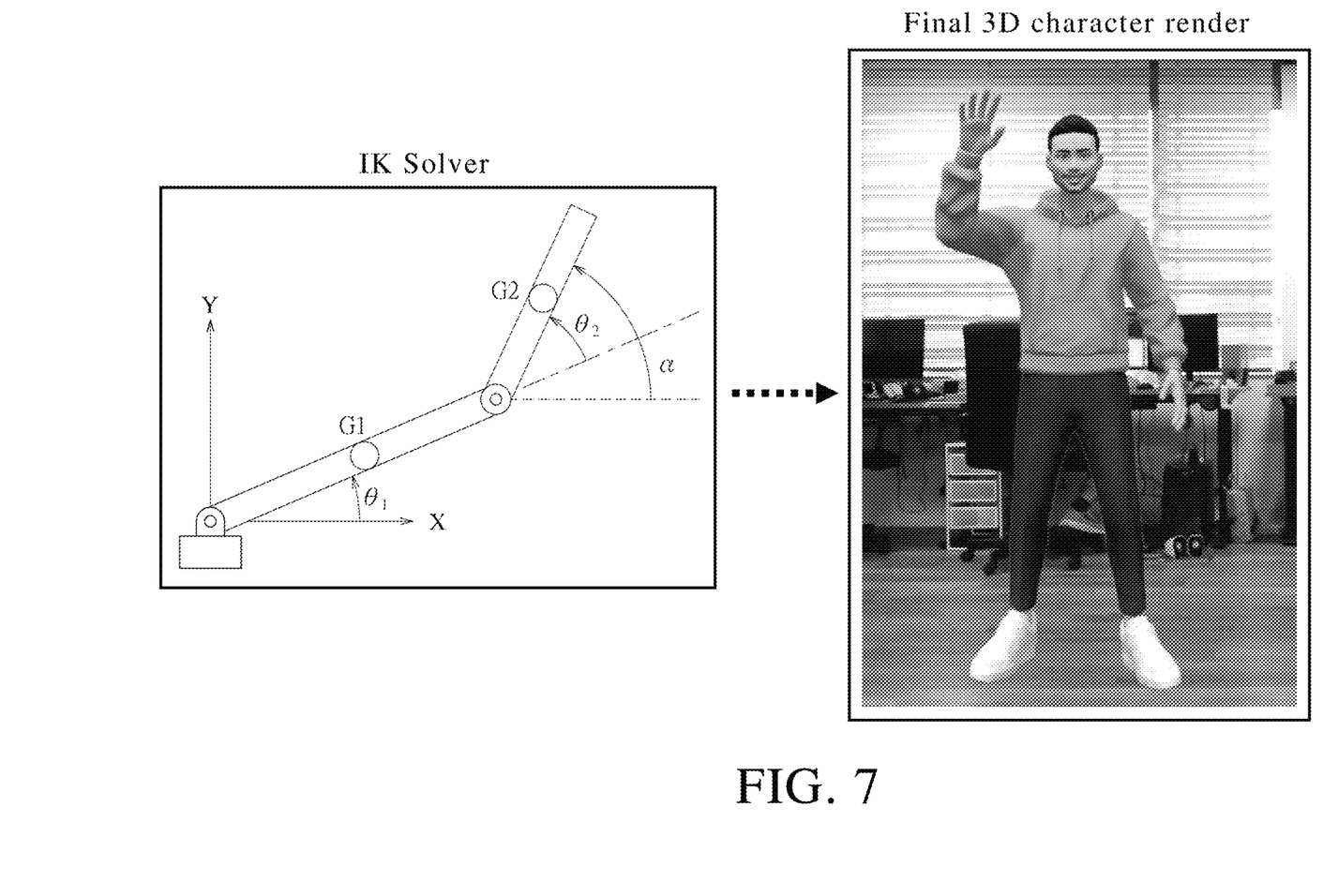
FIG. 7 illustrates the operations relating to a step of the method that uses an inverse kinematics (IK) solver process to pose a 3D avatar based on the 3D global pose.

FIG. 7 illustrates the operations relating to step 210. Specifically, in this embodiment, posing the 3D avatar may include using an inverse kinematics (IK) solver process, but is not limited to such. It is noted that the operations of utilizing the IK solver process is readily known in the related art, the details of the operations are omitted herein for the sake of brevity.

In the embodiment of FIG. 7, the 3D avatar is a human character, and makes a gesture similar to that of the human body captured in the image. It is noted however that, in other embodiments, the 3D avatar may be generated in the form of other arbitrary characters such as an animal character, a role playing game (RPG) character, etc. In such cases, a skeleton retargeting operation may be performed. It is noted that the utilization of the skeleton retargeting operation is readily known in the related art, so the details of the operation are omitted herein for the sake of brevity.

It is noted that the method is implemented with respect to a plurality of successive images captured by the camera 120, and in the cases where the person is moving (e.g., waving his/her hand), when the 3D global poses for the successive images are generated, and the 3D avatar is posed to sequentially strike the 3D global poses and is presented on the interface, with the resulting effect looking like the 3D avatar is also waving his/her hand, to a viewer of the interface 700.

To sum up, the embodiments of the disclosure provide a method and a system for generating a 3D global pose from an image. It is noted that since the structure of the neural networks and the numerical optimization solver utilized in the method are relatively less complex (i.e., using the numerical optimization solver to generate a best guess of the 3D global pose is less complex than the conventional ways of generating the entire 3D global pose), the computations of the method can be implemented using household electronic devices (e.g., a consumer grade laptop, a personal computer, other customized computing hardware, etc.) with a relatively low rendering (processing) time. As such, other than pre-recorded videos, the method may also be implemented using live video feeds (up to 30 frames per second). Additionally, the method may be implemented to generate the 3D global pose that corresponds to the pose of the human body of the person without the person needing to wear any motion capture sensor or headset. As a result, the method can be implemented with relatively low hardware cost and a higher efficiency and is applicable for real-time live videos.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for generating a three-dimensional (3D) global pose from an image, the method being implemented using a system that includes a computing device and a camera which is configured to capture the image, and comprising:

a) by the computing device, receiving the image from the camera, and performing a detection operation to detect a human body in the image;

b) by the computing device, using a first neural network, based on the image in which the human body has been detected, to obtain a two-dimensional (2D) heatmap that is related to a skeleton structure of the human body and that includes a plurality of human keypoints corresponding to a plurality of joints of the human body, and performing a regression operation on the 2D heatmap to obtain a plurality of 2D coordinate sets each associated with one of the joints, and indicating a position of a corresponding one of the human keypoints in a 2D coordinate system of the 2D heatmap;

c) by the computing device, using a second neural network to perform a 3D human pose estimation operation on the plurality of 2D coordinate sets, so as to obtain a 3D human pose that is related to the skeleton structure of the human body in a local coordinate system, and that includes a plurality of 3D keypoints corresponding to the plurality of human keypoints, respectively; and d) by the computing device based on the 3D human pose, using a numerical optimization solver to generate the 3D global pose in a world coordinate system, the numerical optimization solver being Ceres solver, wherein step d) includes d-1) generating an initial guess shape for the 3D global pose by using Levenberg-Marquardt (LM) algorithm and a dense QR factorization to obtain plural sets of coordinates in the world coordinate system for the plurality of 3D keypoints, respectively, the initial guess shape including the plural sets of coordinates, d-2) performing an iterative fitting procedure on the initial guess shape with reference to the plurality of 2D coordinate sets using the numerical optimization solver, so as to generate an updated shape that includes a plurality of 3D coordinate sets which respectively correspond to the joints of the human body, d-3) calculating an error associated with the updated shape, the calculation being implemented based on a difference between projections of the plurality of 3D coordinate sets of the updated shape onto the 2D coordinate system and the plurality of 2D coordinate sets, a relationship between each foot of the updated shape and a floor in the world coordinate system, and an acceleration associated with each of the joints of the updated shape relative to a previous global 3D pose generated with respect to a previous image, d-4) determining whether the error indicates that the updated shape is an optimized shape, d-5) when it is determined that the error indicates that the updated shape is the optimized shape, using the updated shape as the 3D global pose, and when it is determined that the error indicates that the updated shape is not the optimized shape, using the updated shape as the initial guess shape, and repeating sub-steps d-2) to d-5).

2. The method of claim 1, further comprising posing a 3D avatar based on the 3D global pose, wherein posing the 3D avatar includes using an inverse kinematics (IK) solver process.

3. The method of claim 2, wherein posing the 3D avatar further includes performing a skeleton retargeting operation.

4. The method of claim 1, wherein in step b), the first neural network is a convolutional neural network (CNN) that uses modified SelecSLS as a backbone and modified Lightweight human pose estimation as a main framework, and is trained using a Microsoft Common Objects in Context (MS COCO) dataset, a Haple Full-Body Human Keypoints and HOI-Det dataset, and a PoseTrack dataset.

5. The method of claim 1, wherein in step c), the second neural network is a convolutional neural network (CNN) and is trained using a synthesis dataset generated using Archive of Motion Capture as Surface Shapes (AMASS) dataset.

6. A system for generating a three-dimensional (3D) global pose from an image, the system comprising:

a computing device that includes a processor and a data storage medium which stores a first neural network, a second neural network and a numerical optimization solver; and a camera that is coupled to the computer device and that is configured to capture an image, wherein the system is configured to perform steps of a method for generating a three-dimensional (3D) global pose from an image, so as to generate the 3D global pose in a world coordinate system, the method includes:

a) by the computing device, receiving the image from the camera, and performing a detection operation to detect a human body in the image;

b) by the computing device, using a first neural network, based on the image in which the human body has been detected, to obtain a two-dimensional (2D) heatmap that is related to a skeleton structure of the human body and that includes a plurality of human keypoints corresponding to a plurality of joints of the human body, and performing a regression operation on the 2D heatmap to obtain a plurality of 2D coordinate sets each associated with one of the joints, and indicating a position of a corresponding one of the human keypoints in a 2D coordinate system of the 2D heatmap;

c) by the computing device, using a second neural network to perform a 3D human pose estimation operation on the plurality of 2D coordinate sets, so as to obtain a 3D human pose that is related to the skeleton structure of the human body in a local coordinate system, and that includes a plurality of 3D keypoints corresponding to the plurality of human keypoints, respectively; and d) by the computing device based on the 3D human pose, using a numerical optimization solver to generate the 3D global pose in a world coordinate system, the numerical optimization solver being Ceres solver, wherein step d) includes d-1) generating an initial guess shape for the 3D global pose by using Levenberg-Marquardt (LM) algorithm and a dense QR factorization to obtain plural sets of coordinates in the world coordinate system for the plurality of 3D keypoints, respectively, the initial guess shape including the plural sets of coordinates, d-2) performing an iterative fitting procedure on the initial guess shape with reference to the plurality of 2D coordinate sets using the numerical optimization solver, so as to generate an updated shape that includes a plurality of 3D coordinate sets which respectively correspond to the joints of the human body, d-3) calculating an error associated with the updated shape, the calculation being implemented based on a difference between projections of the plurality of 3D coordinate sets of the updated shape onto the 2D coordinate system and the plurality of 2D coordinate sets, a relationship between each foot of the updated shape and a floor in the world coordinate system, and an acceleration associated with each of the joints of the updated shape relative to a previous global 3D pose generated with respect to a previous image, d-4) determining whether the error indicates that the updated shape is an optimized shape, d-5) when it is determined that the error indicates that the updated shape is the optimized shape, using the updated shape as the 3D global pose, and when it is determined that the error indicates that the updated shape is not the optimized shape, using the updated shape as the initial guess shape, and repeating sub-steps d-2) to d-5).

7. The system of claim 6, wherein the processor is further configured to pose a 3D avatar based on the 3D global pose, wherein the processor is configured to pose the 3D avatar by using an inverse kinematics (IK) solver process.

8. The system of claim 7, wherein the processor is configured to pose the 3D avatar by further performing a skeleton retargeting operation.

9. The system of claim 6, wherein the first neural network is a convolutional neural network (CNN) that uses modified SelecSLS as a backbone and modified Lightweight human pose estimation as a main framework, and is trained using a Microsoft Common Objects in Context (MS COCO) dataset, a Haple Full-Body Human Keypoints and HOI-Det dataset, and a PoseTrack dataset.

10. The system of claim 6, wherein the second neural network is a convolutional neural network (CNN) and is trained using a synthesis dataset generated using Archive of Motion Capture as Surface Shapes (AMASS) dataset.

* * * * *